(12) United States Patent
Saika

(10) Patent No.: US 7,262,801 B2
(45) Date of Patent: Aug. 28, 2007

(54) IMAGE PROCESSING APPARATUS HAVING MULTIPLE RESOLUTIONS

(75) Inventor: Toshihiro Saika, Kanagawa (JP)

(73) Assignees: Canon Kabushiki Kaisha, Tokyo (JP); Canon Components, Inc., Saitama-ken (JP)

(*) Notice: Subject to any disclaimer, the term of this patent is extended or adjusted under 35 U.S.C. 154(b) by 555 days.

(21) Appl. No.: 10/090,840

(22) Filed: Mar. 6, 2002

(65) Prior Publication Data

US 2002/0135827 A1 Sep. 26, 2002

(30) Foreign Application Priority Data

Mar. 9, 2001 (JP) ............... 2001-066895

(51) Int. Cl.
*H04N 3/14* (2006.01)
*H04N 5/335* (2006.01)

(52) U.S. Cl. ............... 348/304; 348/308; 348/310

(58) Field of Classification Search ............ 348/240.2, 348/302, 304, 307–310, 294
See application file for complete search history.

(56) References Cited

U.S. PATENT DOCUMENTS

| | | | | |
|---|---|---|---|---|
| 4,928,137 A | * | 5/1990 | Kinoshita | 348/297 |
| 5,459,582 A | * | 10/1995 | Takahashi | 386/112 |
| 6,100,583 A | * | 8/2000 | Ohmori | 257/704 |
| 6,111,245 A | * | 8/2000 | Wu et al. | 250/208.1 |
| 6,124,888 A | * | 9/2000 | Terada et al. | 348/302 |
| 6,130,420 A | * | 10/2000 | Tanaka et al. | 250/208.1 |
| 6,181,442 B1 | * | 1/2001 | Ogura et al. | 358/475 |
| 6,292,218 B1 | * | 9/2001 | Parulski et al. | 348/220.1 |
| 6,801,345 B1 | * | 10/2004 | Imamura | 358/509 |

FOREIGN PATENT DOCUMENTS

| | | |
|---|---|---|
| GB | 2 151 874 | 7/1985 |
| JP | 3-74961 | 3/1991 |
| JP | 5-227362 | 9/1993 |
| JP | 8-88728 | 4/1996 |
| JP | 8-204919 | 8/1996 |
| JP | 2000-101803 | 4/2000 |

OTHER PUBLICATIONS

EP Search Report dated May 27, 2002.

* cited by examiner

*Primary Examiner*—Ngoc-Yen Vu
*Assistant Examiner*—Hung Lam
(74) *Attorney, Agent, or Firm*—Fitzpatrick, Cella, Harper & Scinto

(57) ABSTRACT

There is provided an image processing apparatus comprising: a sensor including a plurality of pixels each including a light receiving element, and a scanning circuit for reading out signals in time sequence from the plurality of pixels; and a drive circuit which supplies pulses for driving the scanning circuit, wherein the drive circuit is so arranged to output at least a first pulse and a second pulse smaller than the first pulse, the drive circuit supplying the first pulse to the scanning circuit when a first resolution is selected, and supplying the first pulse and the second pulse to the scanning circuit when a second resolution lower than the first resolution is selected.

7 Claims, 9 Drawing Sheets

IMAGE PROCESSING APPARATUS HAVING MULTIPLE RESOLUTIONS

BACKGROUND OF THE INVENTION

1. Field of the Invention

The present invention relates to a sensor having a plurality of light receiving elements and a scanning circuit which reads out signals in time sequence from the plurality of light receiving elements.

2. Related Background Art

In recent years, in the field of information processing systems, as to one-dimentional image reading apparatus, a development of contact type of equal magnification image sensors in which a plurality of semiconductor optical sensor chips are mounted has been positively pursued in contrast with that of conventional reduction-system line sensors using an optical system.

For example, Japanese Laid-open Patent Application No. 05-227362 discloses a contact-type image sensor which has a newly-added control terminal for resolution control, and the resolution of which can be changed by a user according to a use condition.

FIG. 1 is a circuit diagram of an integrated circuit of the contact-type image sensor disclosed in the above-described Japanese Laid-open Patent Application. In this conventional art, a control terminal 125 is provided on an image sensor chip. To change the resolution of the image sensor chip, a user inputs through the terminal 125 a high-level or low-level signal for selection between a high resolution mode and a low resolution mode.

The circuit shown in FIG. 1 will be outlined below. A start pulse S1 and clock pulses CLK are supplied to shift registers 104. When a shift register 104a is started up by the start pulse S1, an output from the shift register 104a is input to a channel selection switch 103a through a NOR gate 121a and an AND gate 120a. The channel selection switch 103a is thereby turned on to extract a signal from a photocell 101a to a signal line 107a. Other shift registers 104b to 104f are successively started up to output a signal from each of photocells 101b to 101l to the signal line 107a or 107b.

When a control signal "H" is input to the control signal input terminal 125, analog switches 110a, 110b, 122a, and 122b are switched over to obtain at an image output terminal 111 an image signal of a reading density of 16 dots/mm. When a control signal "L" is input to the control signal input terminal 125, the analog switch 110a is always set in an on state and an image signal of a reading density half the density of the entire photocells 101a to 101l, i.e., 8 dots/mm is obtained at the image output thermal 111. That is, while all the photocells 101a to 101l on the sensor IC are always operating, the image signal can be read out from the photocells with being thinned out a part of the signals according to the control signal. Thus, the voltage level of the image signal is always constant and an image processing circuit of a conventional configuration can be used to process the output image signal read out from the photocells.

In the above-described readout, however, it is necessary to read signals from all the light receiving elements irrespective of the selection between high resolution reading and low resolution reading and to uniformly set a readout time required for reading from all the light receiving elements.

SUMMARY OF THE INVENTION

It is an object of the present invention to provide an image processing apparatus capable of obtaining a reading speed corresponding to the resolution.

In order to achieve the above-mentioned object, according to a scope of the present invention, there is provided an image processing apparatus comprising: a sensor including a plurality of pixels each including a light receiving element, and a scanning circuit for reading out signals in time sequence from the plurality of pixels; and a drive circuit which supplies pulses, for driving the scanning circuit, wherein the drive circuit is so arranged to output at least a first pulse and a second pulse smaller than the first pulse, and the drive circuit supplies the first pulse to the scanning circuit when a first resolution is selected, and supplies the first pulse and the second pulse to the scanning circuit when a second resolution lower than the first resolution is selected.

Another object and features of the present invention will be apparent by the following embodiment.

DESCRIPTION OF THE PREFERRED EMBODIMENTS

Figure 1:
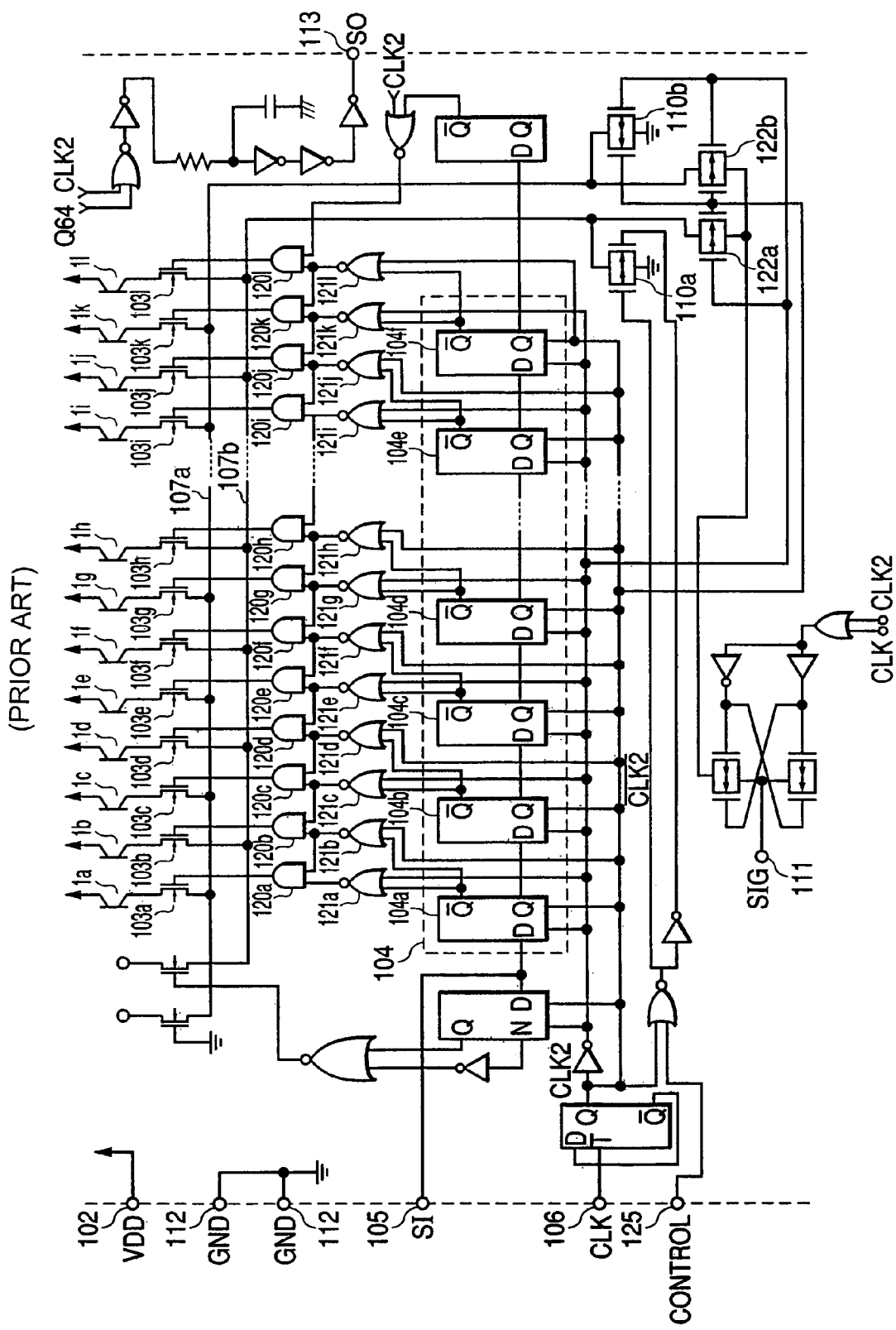
FIG. 1 is a circuit diagram of a conventional integrated circuit for a contact-type image sensor.
Figure 2:
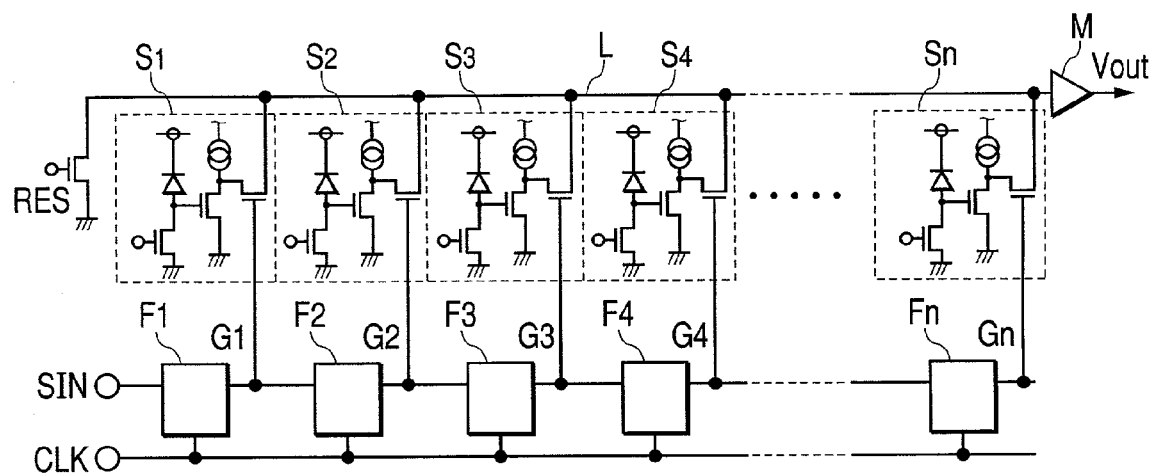
FIG. 2 is a circuit diagram showing a configuration of a sensor chip used in a multichip-type sensor according to an embodiment.

FIG. 2 is a circuit diagram showing an embodiment of a configuration of a sensor chip used in a multichip-type sensor described below. This image sensor chip is formed on the same substrate by a complementary metal-oxide-semiconductor (CMOS) process or the like so as to be integrally combined with other circuit components. In FIG. 2, broken-line regions S1, S2, S3, S4, . . . , Sn respectively represent pixels. Output signals from the respective pixels S1 to Sn are output via a common output line L and the amplifier M. The common output line L is reset by a reset transistor RES. The respective pixels S1, S2, S3, S4, . . . , Sn are successively selected by D flip-flops F1, F2, F3, F4, . . . , Fn constituting a shift register (scanning circuit).

Figure 3:
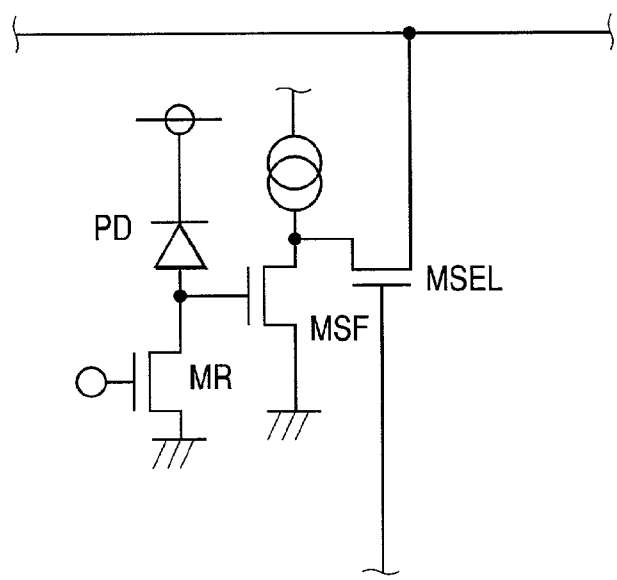
FIG. 3 is a circuit diagram showing an example of a configuration of one pixel.

FIG. 3 is a circuit diagram showing an example of a configuration of one pixel. The pixel shown in FIG. 3 represents an example of a photosensor called a CMOS sensor.

As shown in FIG. 3, the pixel has a photodiode PD (light receiving element), a reset transistor MR, an amplifier transistor MSF forming a pixel amplifier, and a selecting transistor MSEL for selecting a pixel. The selecting transistor MSEL is controlled by the corresponding one of output signals G1 to Gn from the D flip-flops F1 to Fn. A photoelectrically converted signal from the photodiode PD is transferred to the gate of the amplifier transistor MSF forming a pixel amplifier and produces a signal which is output through the pixel amplifier MSF and the selecting transistor MSEL. The reset transistor MR is turned on to reset the pixel portion.

Referring to FIG. 2, when a start signal SIN is input to the D flip-flop F1 through the D terminal, and when a clock signal (synchronization pulse) CLK is input to the T terminal, the signal G1 from the D flip-flop F1 becomes an H level and then is input to the gate of the selecting transistor MSEL of the first pixel S1. A signal corresponding to the charge accumulated in the photodiode PD of the first pixel S1 is thereby output to the common output line L. When the next clock signal CLK is input through the T terminal, the level of the signal G1 becomes an L level.

When at the same time, the signal G1 is input to the next-stage flip-flop F2 through the D terminal, and when the clock signal CLK is input to the T terminal, the level of the signal G2 from the D flip-flop F2 becomes the H level and then is input to the gate of the selecting transistor MSEL of the second pixel S2. A signal corresponding to the charge accumulated in the photodiode PD of the second pixel S2 is thereby output to the common output line L (signal reading from this pixel is virtually stopped at the time of low-resolution reading described below). Note that the common output line L is reset by the reset transistor RES before the signal is output from each pixel.

Reading of a signal is performed in the same manner up to the nth pixel Sn. Signal Gn is output as a signal for starting the next sensor chip, and signal reading of the next sensor chip is also performed in the same manner.

In this embodiment, a signal can be selectively read from any pixels by setting as desired the pulse width of the clock signal (synchronization pulse) input to the sensor chip.

Figure 4:
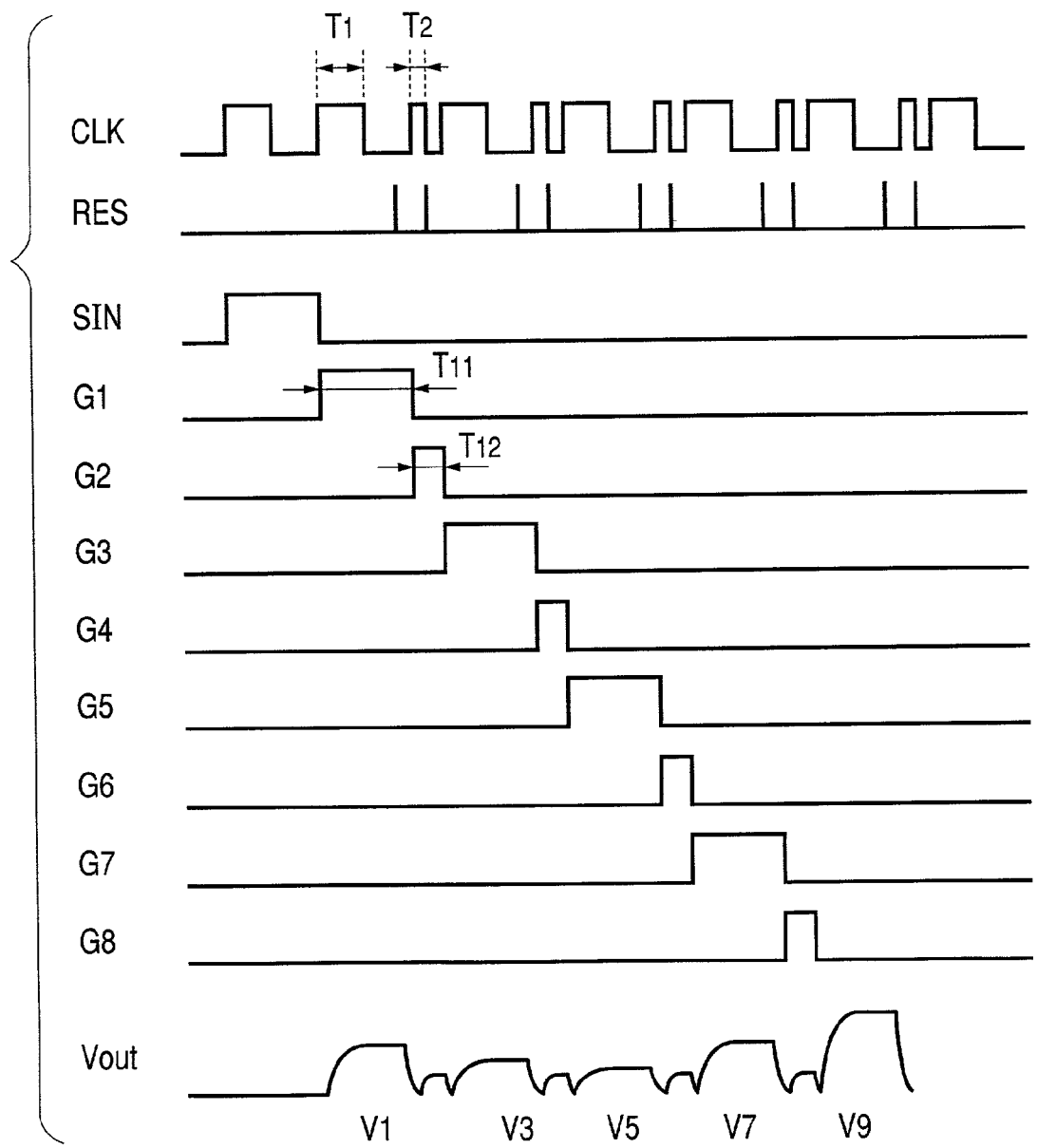
FIG. 4 is a timing chart for explaining operation when a low resolution is selected.
Figure 5:
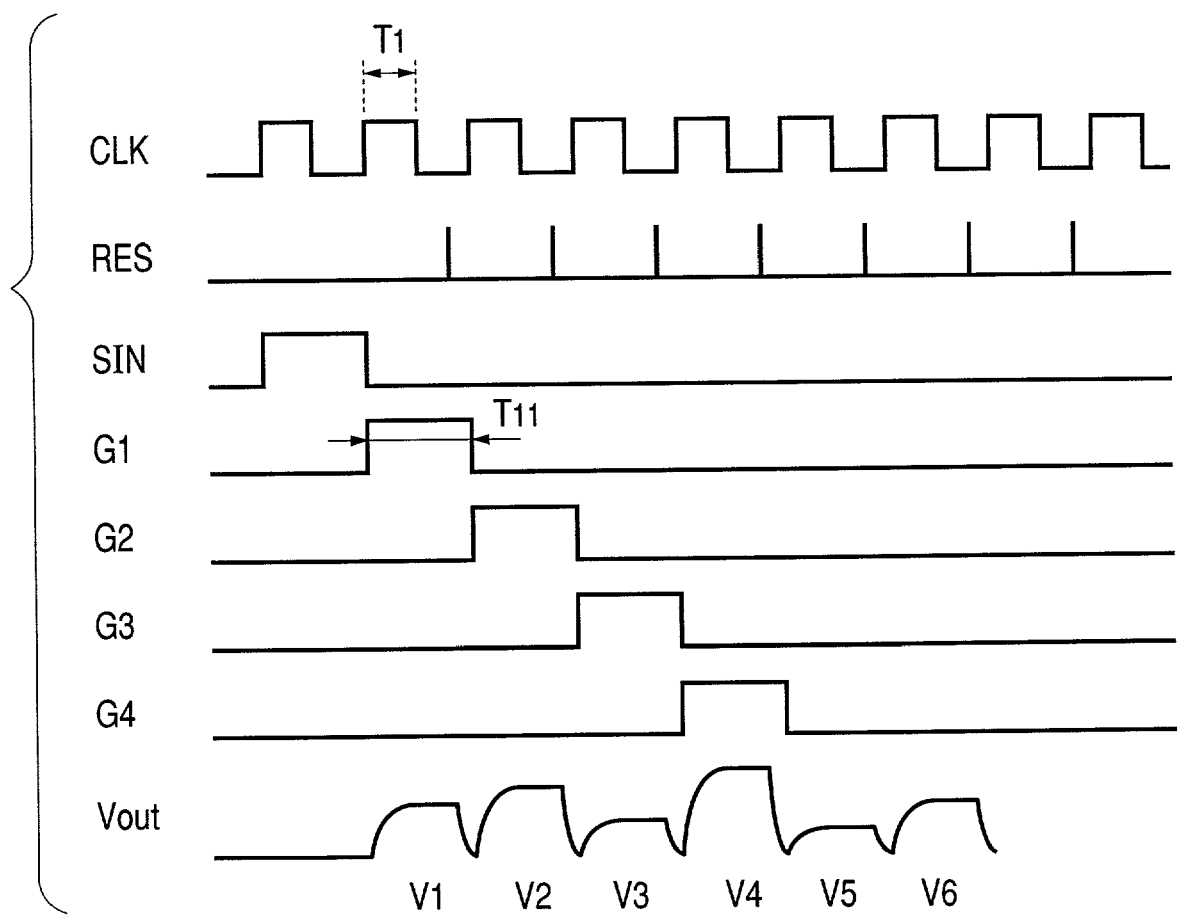
FIG. 5 is a timing chart for explaining operation when a high resolution is selected.

A case of performing switching between low resolution reading and high resolution reading will be described. FIG. 4 is a timing chart for explaining the operation in case of low resolution reading, and FIG. 5 is a timing chart for explaining the operation in case of high resolution reading.

A so-called skip reading (thinning-out reading) is performed in case of low resolution reading. As shown in FIG. 4, two pulses having different widths T1 and T2 are alternately input as the clock pulses CLK to form signals G1 to Gn so that signals G1, G3, G5, . . . have a pulse width T11 necessary for normal signal reading of the pixels and signals G2, G4, . . . have a pulse width T12 smaller than the pulse width T11. Then, normal reading of signals from the pixels S1, S3, S5, . . . is performed to output V1, V3, V5, . . . as output Vout. Signal reading of the pixels S2, S4, . . . is virtually stopped since the reading period is short. In this case, since there is no need for signal reading of the pixels S2, S4, . . . , it is desirable to set the level of signals G2, G4, . . . to the lower limit of the range in which the flip-flop can operate. If it is necessary to perform reading with a further lower resolution, the shift register may be supplied with a train of the clock pulses CLK in which two or three pulses having the width T2 are interposed between pulses having the pulse width T1.

All-pixel reading is performed in case of high resolution reading. That is, normal signal reading of all the pixels S1, S2, S3, S4, S5, . . . is performed. As shown in FIG. 5, clock pulses CLK having the pulse width T1 are input to set the pulse width of signals G1, G2, G3, . . . to the normal pulse width T11.

Figure 6:
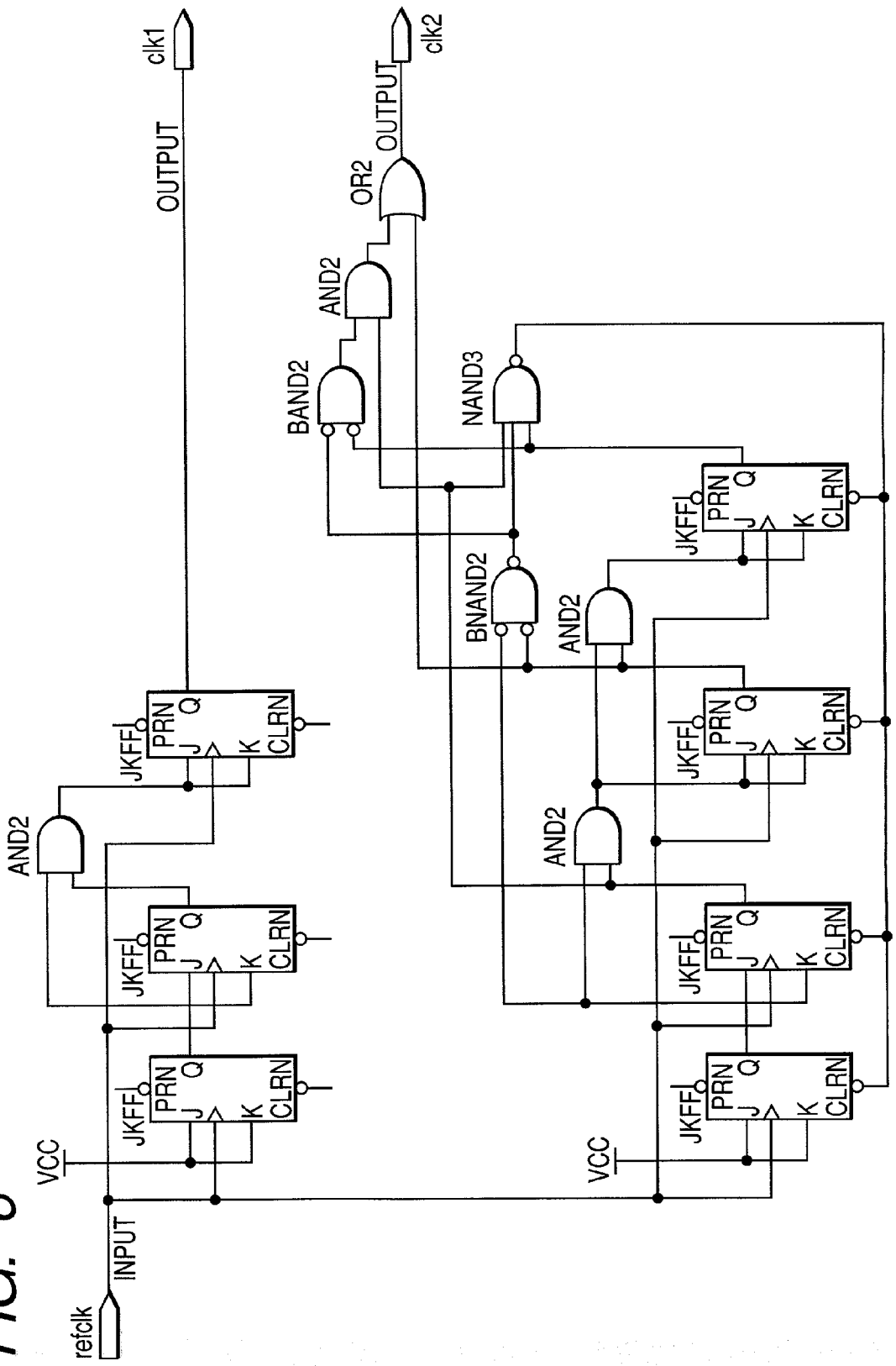
FIG. 6 is a diagram showing a configuration of a circuit for generating normal clock pulses and clock pulses having different pulse widths alternately.
Figure 7:
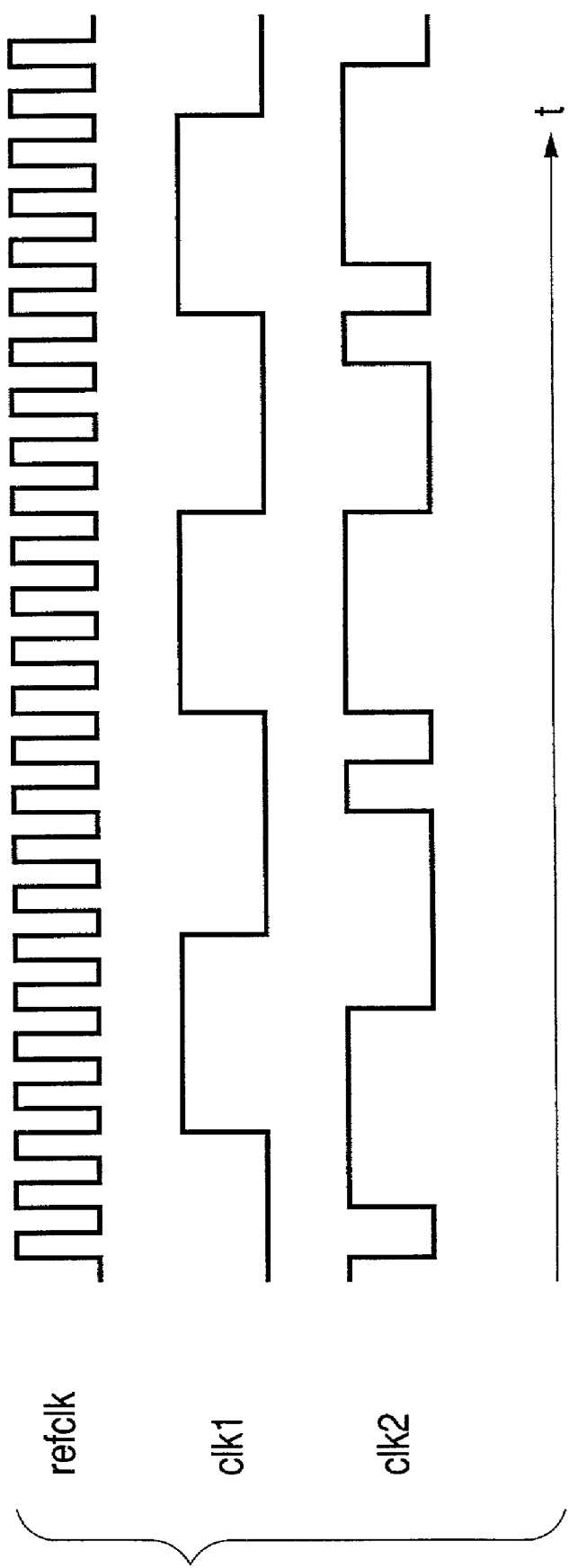
FIG. 7 is a timing chart of the circuit shown in FIG. 4.

FIG. 6 shows a configuration of a sensor drive circuit which generates a normal clock pulse, and which alternately generates clock pulses having different pulse widths. FIG. 7 is a timing chart of the sensor drive circuit. A normal clock pulse clk1 and a clock pulse clk2 where pulse width changes between different widths alternately, are formed from reference clock refclk, and the clock pulse clk1 or the clock pulse clk2 is input as the clock pulse CLK to the sensor chip shown in FIG. 2 as required, thus enabling switching between high resolution reading and low resolution reading.

While in this embodiment a circuit capable of alternately generating clock pulses having different pulse widths is used as a hardware to generate a clock pulse, a clock pulse having different pulse widths may alternatively be generated with software, i.e., by using a program.

A case of performing block reading, i.e., reading out signals from pixel forming regions selected as desired, will next be described. Needless to say, switching between block reading and all-pixel reading can be performed as well as switching between low resolution reading and high resolution reading. A case of reading out signals from the pixels S6 to S8 will be described by way of an example.

Figure 8:
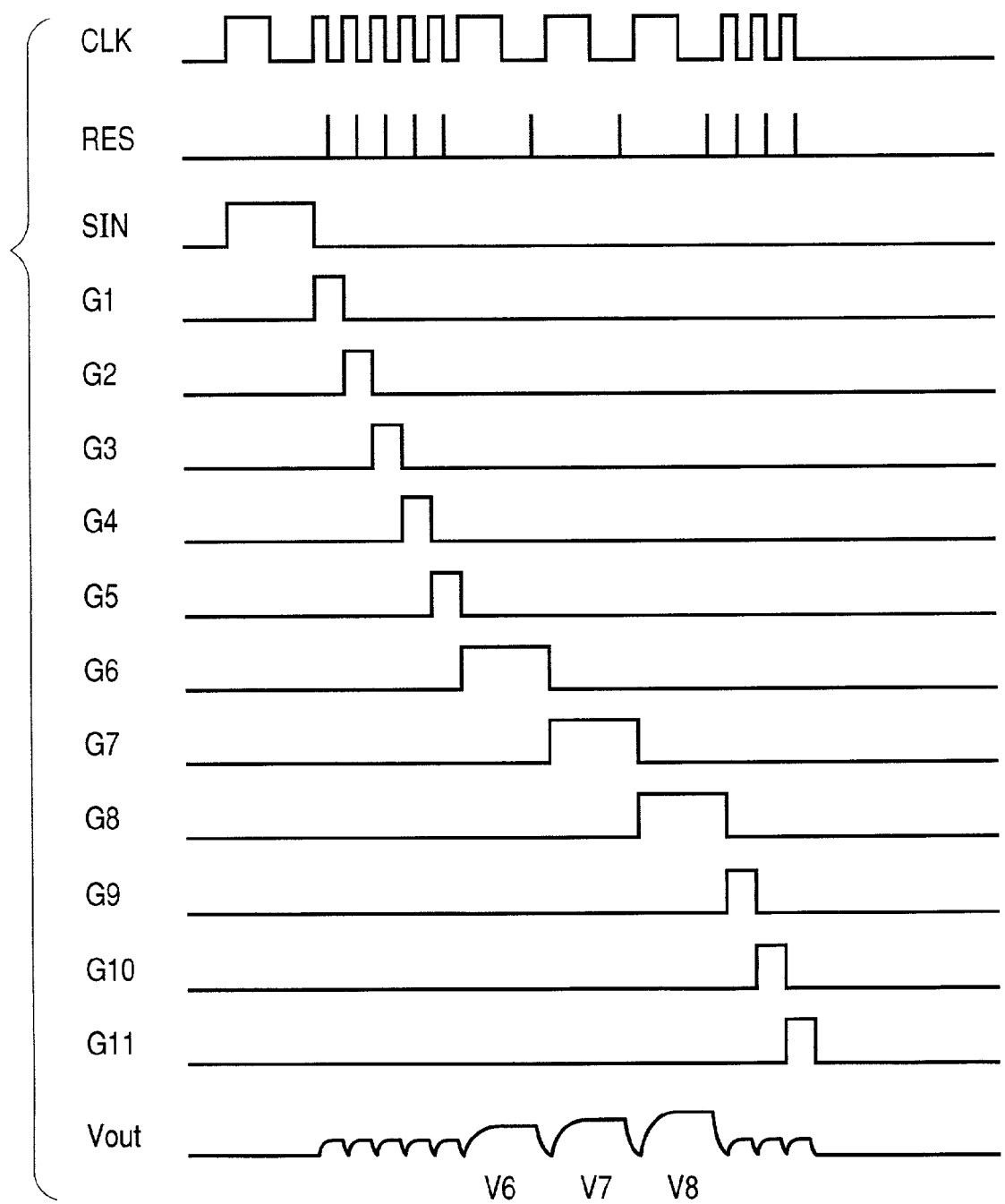
FIG. 8 is a timing chart of block reading.

A train of clock pulses CLK is set in such a manner that, as shown in FIG. 8, signals G6 to G8 have the normal pulse width required for the signal reading while signals G1 to G5 and G9 to G11 have a smaller pulse width, thus enabling selective block reading of signals from the pixels S6 to S8.

An example of a contact-type image sensor unit constructed by using the above-described multichip-style sensor and an application of the contact-type image sensor unit to an image reading system will be described.

Figure 9:
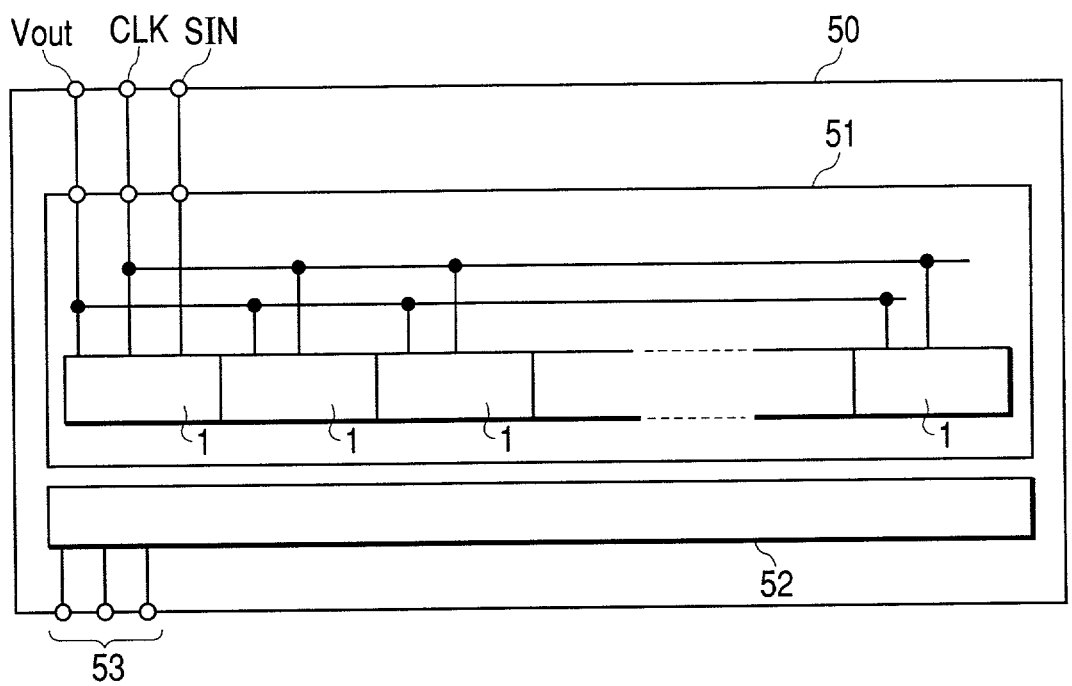
FIG. 9 is a block diagram of a contact-type image sensor unit.
Figure 10:
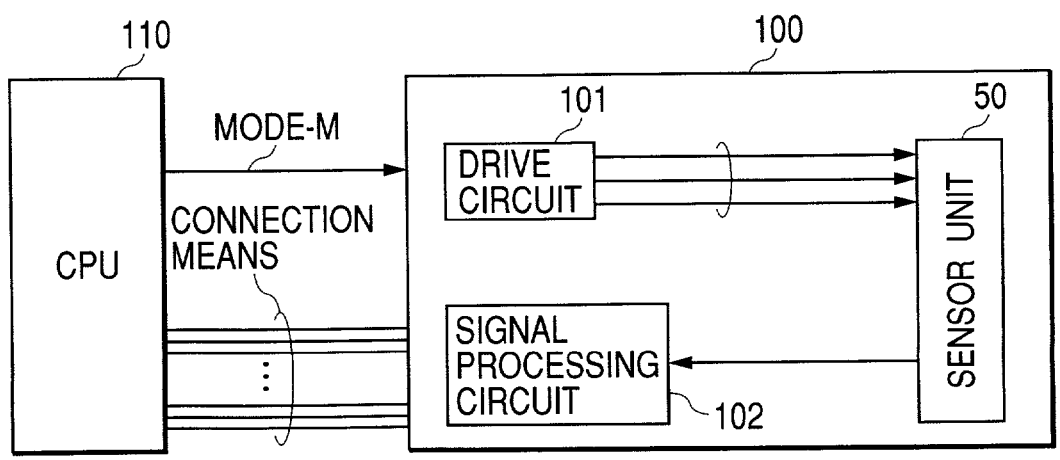
FIG. 10 is a block diagram of an image input system using the contact-type image sensor unit shown in FIG. 9.

FIG. 9 is a block diagram of a contact-type image sensor unit 50. FIG. 10 is a block diagram of an image input system using the contact-type image sensor unit 50.

Referring to FIG. 9, the contact-type image sensor unit 50 is constituted by a sensor module board 51 and a light source 52. Each of portions denoted by reference numeral 1 corresponds to the sensor chip described above with reference to FIG. 2. Light emitting diodes (LEDs) and light guide members for irradiating an original surface with light from the LEDs are used to form the light source 52. A different light source, e.g., one constituted by a light source having a plurality of LED chips mounted one-dimensionally, or one formed of a cold-cathode tube, or the like may alternatively be used. On the sensor module board 51, a plurality of the above-described sensor chips 1 are mounted one-dimensionally on a ceramic board and a signal output (Vout) terminal and a clock signal CLK terminal are connected in common to all the sensor chips in the sensor module.

Further, a light source drive terminal 53 for driving/controlling the light source is provided on the contact-type image sensor unit 50.

FIG. 10 shows an example of an image input system 100 using the contact-type image sensor unit 50 shown in FIG. 9. The image input system 100 is constituted mainly of a drive circuit 101 for electrically driving the sensor and the light source of the contact-type image sensor unit, and a signal processing circuit 102 for processing signals (such as shading correction) output from the contact-type image sensor unit. The operation of the image input system is controlled by a central processing unit (CPU) 110. When switching between a high resolution and a low resolution is performed, a resolution control signal (MODE_M) provided as a command to perform switching from a high or low resolution to a low or high resolution is input from the CPU to the image input system. In the image input system, the resolution control signal is supplied to the sensor drive circuit 101, which includes a drive circuit, such as that shown in FIG. 6, for supplying synchronization pulses, and which changes synchronization pulses on the basis of the resolution control signal. Needless to say, switching between all-pixel reading and block reading can be performed by using the same arrangement.

Through the resolution control signal output from the external CPU, a high resolution mode (600 dpi) is set, for example, when the resolution control signal is high level, and a low resolution mode (300 dpi) is set when the resolution control signal is low level. Note that, in a case where clock pulses having different pulse widths are alternately generated with software, a synchronization pulse signal is directly generated from the CPU to be supplied to the sensor drive circuit 101. In such a case, to change the resolution, pixels which will be skipped (thinned out) can be selected as desired by changing a program for producing synchronization pulses. Also, pixels which will be read out by block reading can be selected as desired.

According to this embodiment, as described above, there is no need to form a circuit for switching between high resolution reading and low resolution reading (or between block reading and all-pixel reading) in each sensor chip, and thus the size of each sensor chip can be reduced. Among multichip-style image sensors used as contact-type image sensors, smaller ones are particularly in high demand because, in each of applications of the multichip-type image sensors to the contact-type image sensors, the multichip-type image sensor is mounted together with a light source for irradiating the original with light, etc., with being close to each other. Therefore the multichip-type image sensor of the present invention can be preferably used as a contact-type image sensor.

Figure 11:
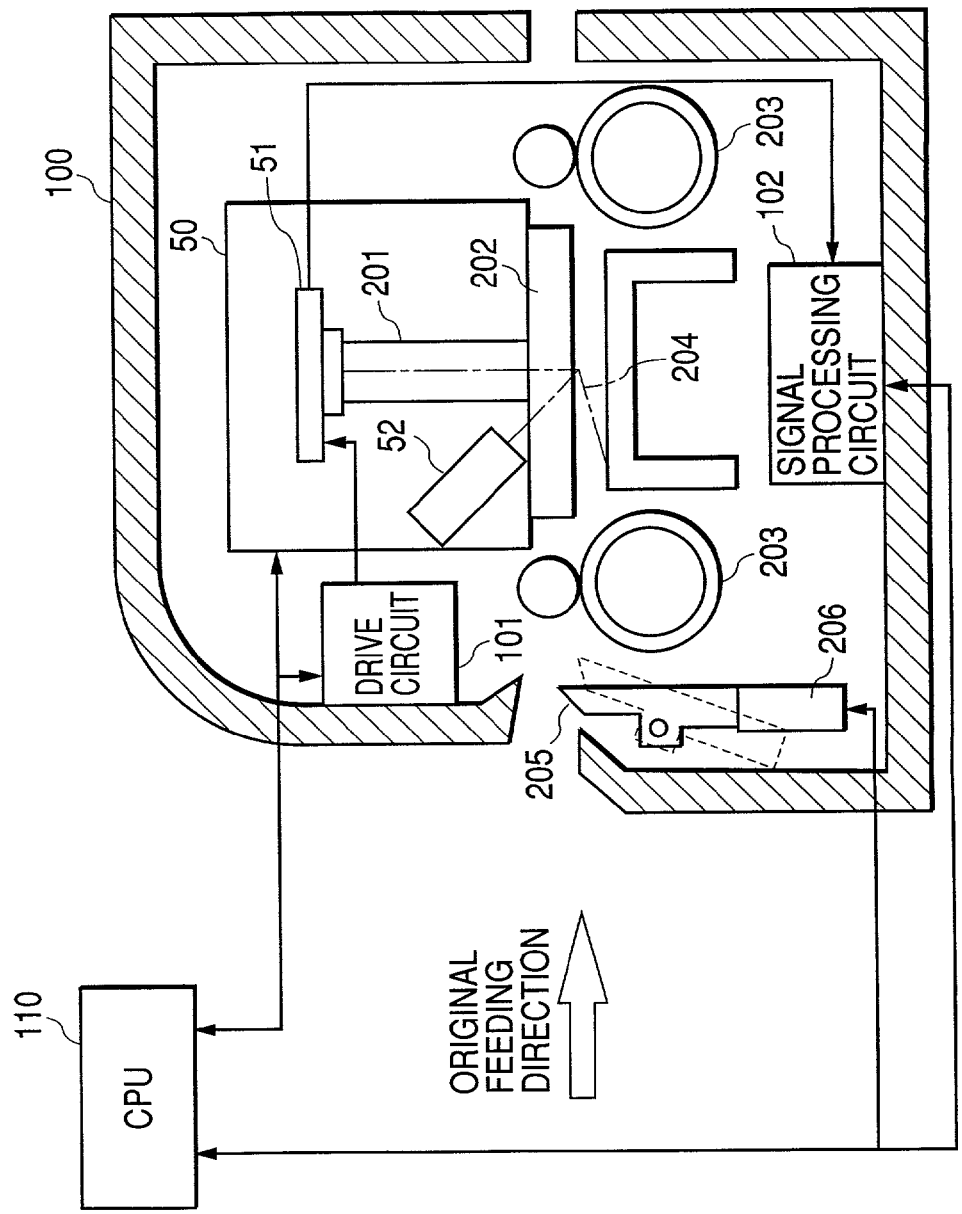
FIG. 11 is a diagram showing details of the system shown in FIG. 10.

FIG. 11 shows details of the system shown in FIG. 10. In FIG. 11, components identical to those shown in FIGS. 9 and 10 are denoted by the same reference numerals.

The contact-type image sensor unit (hereinafter referred to as "CIS") 50 is constituted by the sensor module board 51, a Selfoc lens 201, an LED array 52, and a contact glass 202.

Transport rollers 203 are disposed in the front and at the rear of the CIS 50 and are used to place an original. A contact sheet 204 is used to maintain an original in contact with the CIS 50. The CPU 110 performs overall control of the image reading system including resolution switching. An original detection lever 205 is a lever for detecting insertion of an original. When insertion of an original is detected, that is, when the original detection lever 205 is inclined by insertion of the original to change an output from an original detection sensor 206, the CPU 110 is informed of this condition, determines that the original has been inserted, starts transport of the original by operating a motor for driving the original transport rollers (not shown), and conducts the reading operation. Here, the CPU may be included in the image reading system. The signal processing circuit 102 may be provided outside the image reading system, e.g., in a computer. The arrangement may alternatively be such that not the original but the CIS 50 is moved.

Many widely different embodiments of the present invention may be constructed without departing from scope of the present invention. It should be understood that the present invention is not limited to the specific embodiments described in the specification, except as defined in the appended claims.

What is claimed is:

1. An image processing apparatus comprising:
a sensor including a plurality of pixels each including at least a light receiving element, an amplifier element and a selecting element, wherein an electrical signal from said light receiving element is output to a common output line through said selecting element;
a scanning circuit for reading out the electrical signal in time sequence from the plural pixels; and
a drive circuit which supplies pulses to said selecting element,
wherein said drive circuit is arranged to drive said scanning circuit so that said scanning circuit supplies a first pulse having a first pulse width to said selecting element of a pixel to be read out, when a first resolution is selected, and supplies the first pulse to said selecting element of the pixel to be read out and a second pulse having a second pulse width smaller than the first pulse width to said selecting element of a pixel to be thinned out, when a second resolution lower than the first resolution is selected.

2. An apparatus according to claim 1, wherein when the second resolution is selected, said drive circuit supplies the first pulse in every other pulse or in every plurality of pulses.

3. An apparatus according to claim 2, further comprising a signal processing circuit which performs image processing on the basis of signals which are read out by supplying the first pulse from said scanning circuit.

4. An apparatus according to claim 2, wherein said sensor is formed on the same semiconductor chip, and a plurality of said sensors are mounted on a mount board.

5. An apparatus according to claim 1, wherein said light receiving element, said amplifier element and said selecting element are a photodiode, an amplifier transistor and a selecting transistor, respectively, each of said plurality of pixels further has a reset switch for resetting an input portion of said amplifier transistor, said amplifier transistor amplifies the signal from said photodiode and outputs the amplified signal, and said selecting transistor is arranged to selectively read out the signal from said amplifier transistor.

6. An apparatus according to claim 1, further comprising a control circuit for switching between the first resolution and the second resolution.

7. An apparatus according to claim 1, further comprising a light source for irradiating light on said sensor, and a transport member for moving an original and said sensor relative to each other.

* * * * *